United States Patent [19]

Huddleston

[11] Patent Number: 4,628,760
[45] Date of Patent: * Dec. 16, 1986

[54] REMOTE CONTROL REARVIEW MIRROR AND PIVOT

[75] Inventor: Chester R. Huddleston, Ripley, Miss.

[73] Assignee: Harman Automotive, Inc., Detroit, Mich.

[*] Notice: The portion of the term of this patent subsequent to Feb. 16, 2003 has been disclaimed.

[21] Appl. No.: 458,198

[22] Filed: Jan. 17, 1983

[51] Int. Cl.⁴ .......................... F16C 1/10; F16D 1/12; F16D 3/22
[52] U.S. Cl. .................................. 74/501 R; 403/90
[58] Field of Search ................... 248/484, 487; 403/90, 403/122, 128; 70/364 A; 74/500.5, 502.1

[56] References Cited

U.S. PATENT DOCUMENTS

| | | | |
|---|---|---|---|
| 2,664,029 | 12/1953 | Higgins | 403/90 |
| 3,286,545 | 11/1966 | Malachowski | 74/502.1 |
| 3,554,582 | 1/1971 | Yamashita et al. | 403/90 |
| 3,735,121 | 5/1973 | Jaeger | 403/122 |
| 3,780,598 | 12/1973 | Menger | 74/501 M |
| 3,800,619 | 4/1974 | McIntyre | 74/502.1 |
| 3,853,414 | 12/1974 | Hirano et al. | 403/122 |
| 3,917,212 | 11/1975 | Hadley et al. | 248/487 |
| 3,918,319 | 11/1975 | Mills | 74/491 |
| 3,966,162 | 6/1976 | Hadley | 248/487 |
| 4,003,271 | 3/1975 | Stelma | 74/502.1 |
| 4,262,505 | 4/1981 | Moscatelli | 70/364 A |

FOREIGN PATENT DOCUMENTS

| | | | |
|---|---|---|---|
| 2356198 | 1/1978 | France | 74/502.1 |
| 915924 | 1/1963 | United Kingdom | 403/90 |
| 2094394 | 9/1982 | United Kingdom | 403/122 |
| 0968516 | 10/1982 | U.S.S.R. | 403/122 |

Primary Examiner—Gary L. Smith
Assistant Examiner—Vinh Luong
Attorney, Agent, or Firm—Miller, Morriss & Pappas

[57] ABSTRACT

A rearview mirror and pivot construction therefor having improved stability in mechanically and electrically driven remote control mirror structures and which permits mounting and dismounting of the apparatus at the mirror end. A female hemispherical receiver is matingly engaged against a hemispherical male element. An intermediate armed cross pivot is engaged in a fixed path by both the male and female elements and confines relative pivotal movement between said male and female elements to transverse paths defined by the cross pivot element. One of the male and female elements is secured to a mirror base. The other of the male and female elements is detentably secured to a backing fixture holding the reflective element in the rearview mirror.

6 Claims, 8 Drawing Figures

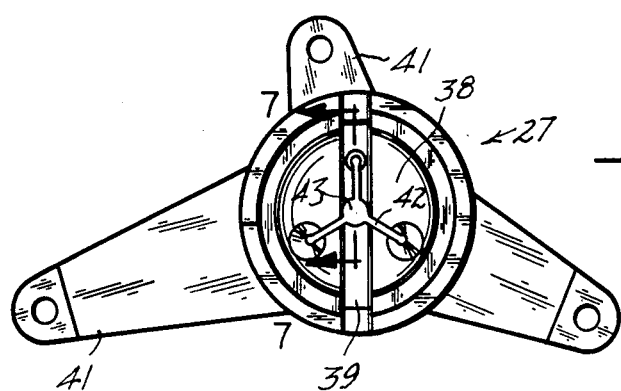
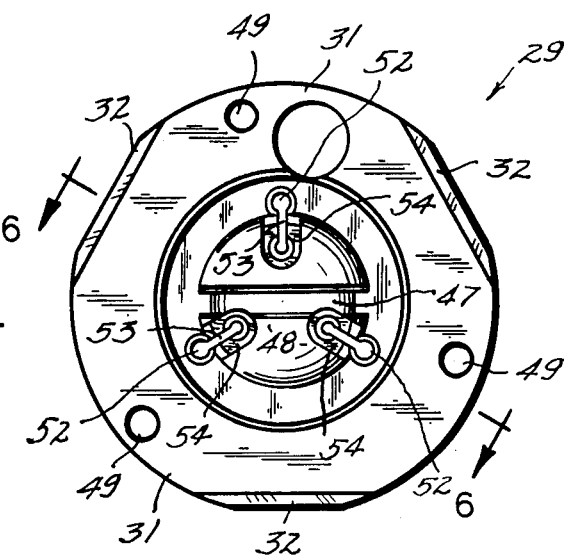
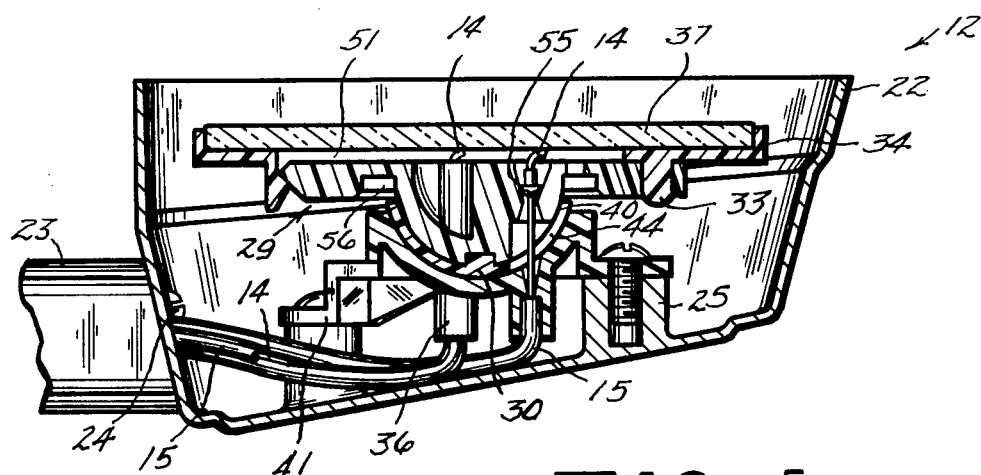

REMOTE CONTROL REARVIEW MIRROR AND PIVOT

The present invention is directed to a new and improved rearview mirror and pivot construction and especially to a new and improved pivot which allows a universal motion through the center of a sphere and achieved in two planes at substantially right angles to each other and in which a superior control over deflection and vibration in each plane results. Such a pivot is very desirable in rearview mirrors and is especially essential in remote control rearview mirrors of the mechanical and electrical actuation type used in automobiles. The present invention is also directed to a mirror mounting and dismounting system which allows the rearview mirror to be disassembled at the mirror end as contrasted with prior art systems in which no means were provided at the mirror case or end for disassembly. Most always the disassembly in the prior art work was achieved in the remote control devices by commencing at the control or actuator end.

The prior art has been characterized by point or pivot universal structures using cross arms or trunnion and separate journals closing on the intermediate pivot element. Each have represented advancing effort to stabilize the mirror and to allow it to move in separate planes simultaneously but not quite eliminating the chatter or vibration induced by the vehicle itself. A wide variety of pivotal structures have sought for increased stability and examples are found in U.S. Pat. No. 3,780,598 to Menger, 3,917,212 to Hadley and Fisher, 3,918,319 to Mills and 3,966,162 to Hadley. These have not proposed a spherical segment cross pivot element having integral arcuate key portions, one of the key portions arcuately extending into key engagement with a hemispherical spherical female receiver element and the other of the key portions in simultaneous key engagement with a male hemispherical segment nesting in the female receiver. None of the known prior art has proposed a firm clip-on mirror allowing disassembly of the mirror structure from the mirror housing external of the vehicle.

Accordingly, the principal object of the present invention is to provide a new and improved remote control automobile rearview mirror construction in which a pair of functionally integrated arcuate hemispherically keys, one functioning in moving a mirror in the climb-dive mode and the other functioning to control movement normal to the plane of first movement on a point common to both motions.

Another object is to provide a mirror assembly structure and procedure in which the mirror glass is directly secured to the movable pivot plate and using integral hinges so that removal of the mirror glass and pivot plate can be achieved. This object facilitates repair by making available the structural elements behind the mirror glass for repair and replacement of parts.

Still another object is to combine the aforementioned spherical segment universal cross pivot structure and the pivot plate attachment in such a manner as to adapt the structure to remote control rearview mirrors especially as cable operated and as electrically powered. Collaterally, by using a larger diameter sphere sector as the male-female mating surface and by hemispherically keying the relative motion of each hemispherical element, then the pivotal surface offset is reduced and the overall assembly depth of such devices is diminished. This enhances the design of relatively thin profile rearview mirror elements.

Other objects including economy, serviceability and simplicity of contruction will become increasingly apparent as the description proceeds.

IN THE DRAWING

FIG. 3 is a top plan view of the hemispherical female receiver looking into the receiver cavity and indicating the hemispherical keyway in the female hemispherical surface. Access slot openings for actuating cables are shown radiating inwardly from pockets forming thrust buttresses for cables, not shown.

FIG. 4 is a top plan view of the male hemispherical element and indicating the keyway which hemispherically extends into the male hemispherical element in a direction, upon assembly, to be transverse to the keyway of the keyway shown in FIG. 3. The cable receiving slots are shown and which slots are in substantial register with slots of the female receiver.

FIG. 5 is a side elevation cross section through the decorative outer mirror shroud or cover and the pivotal structure showing the assembled inrterrelationship of the male and female mating elements and the intermediate hemispherical key element held in compression relation by means of the actuating cables and the cable ends are seen to be extended beyond the ferrules so that disassembly can be achieved from behind the face of the mirror glass or upon removal of the glass case.

Figure 6:
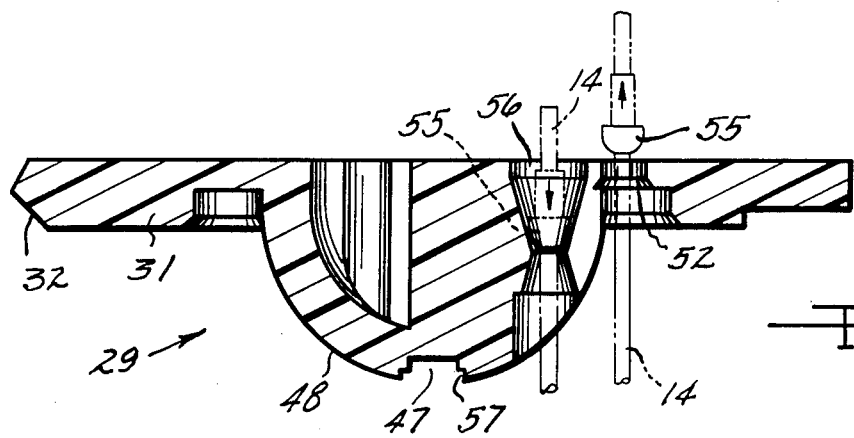

FIG. 6 is a cross section elevation view taken on line 6—6 of FIG. 4 through the male hemispherical segment and the arcuate keyway and through one of the ferrule sockets and the assembly slots indicate, in phantom line, the assembly and disassembly from the ferrule ends of the cables at the mirror end of the mirror structure.

Figure 7:
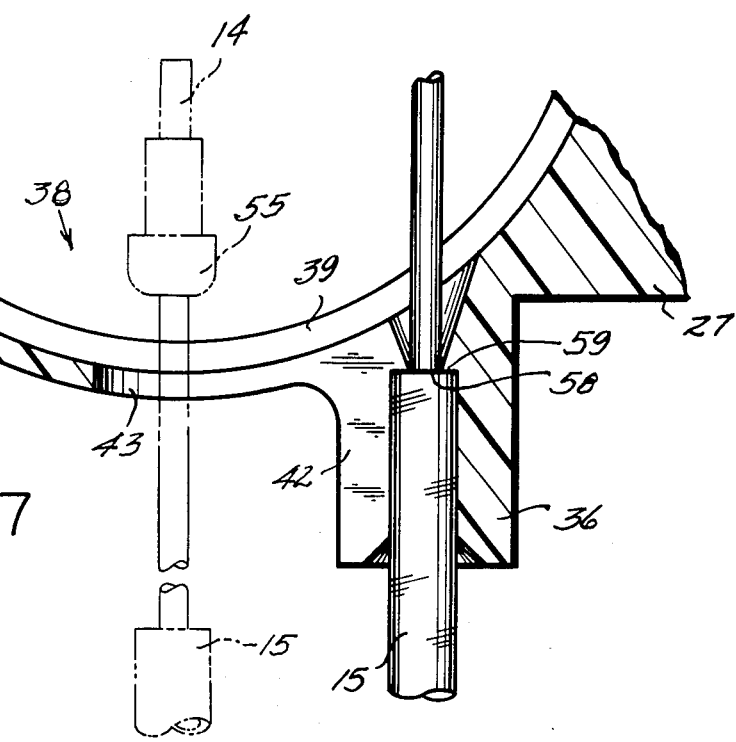

FIG. 7 is a similar cross section elevation detail taken on the line 7—7 of FIG. 3 showing the female hemispherical receiver and indicating the assembly of the cable through the receiver to its final position shouldering the cable sheath against a thrust buttress.

Figure 8:
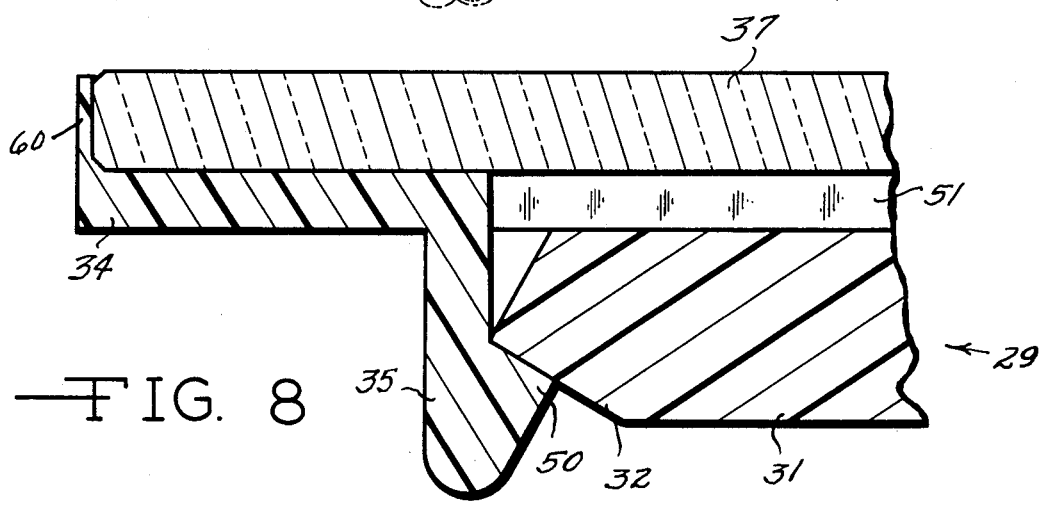

FIG. 8 is a partial cross section detail through the mirror case glass and the extension of the male hemispherical element and indicating the locking detent engagement of case to the flange extensions of the male element.

GENERAL DESCRIPTION

In general, the present invention is a connecting and pivot construction for devices requiring limited universal movement about a point as in automotive rearview mirrors of the remote control type and where the pivot element is made from a hemispherical segment cross pivot element forming a key in respect to the two mating hemispherical elements positioned on each side of the spherical cross pivot to achieve a keyed hemispherical control allowing two planes of movement, one in the plane of the key guiding the hemispherical movement of the male element and one in the plane of the key portion guiding the female element. A compound resultant movement is obtained in respect to a controlled element such as a mirror connected to one of the male or female spherical elements for limited universal movement. The connection of the mirror to one of the hemispherical elements is facilitated by a detent connection.

In general, the pivot comprises a pair of arcuate segments which each have a generally rectangular cross section configuration and which are integral at their transverse crossing so that one extends to nest in an arcuate groove in the male element and the other extends to nest in the arcuate groove of the female receiver.

This construction improves the stability of the pivot assembly and allows the glass case to be directly attached to one of the male or female elements. The other of the male or female elements can be secured to a suitable, for example decorative, shroud base or encasement. As will be seen, actuating elements can be passed through the pivot elements wihtout operational interference and the assembly back of the mirror glass and case allows disassembly from the mirror side of remote control rearview mirror devices in contrast to prior disassembly for repair and maintenance which formerly required disconnect at the actuator end of the system. Finally, as will be appreciated, the arcuate segments of the cross pivot elements provide a convenient stop means restricting or limiting the amount of universal movement at assembly as selected. The principal components are amenable to precision die casting or injection molding of the metal or plastic elements to expedite assembly and interchangeability of mass produced parts.

SPECIFIC DESCRIPTION

Figure 1:
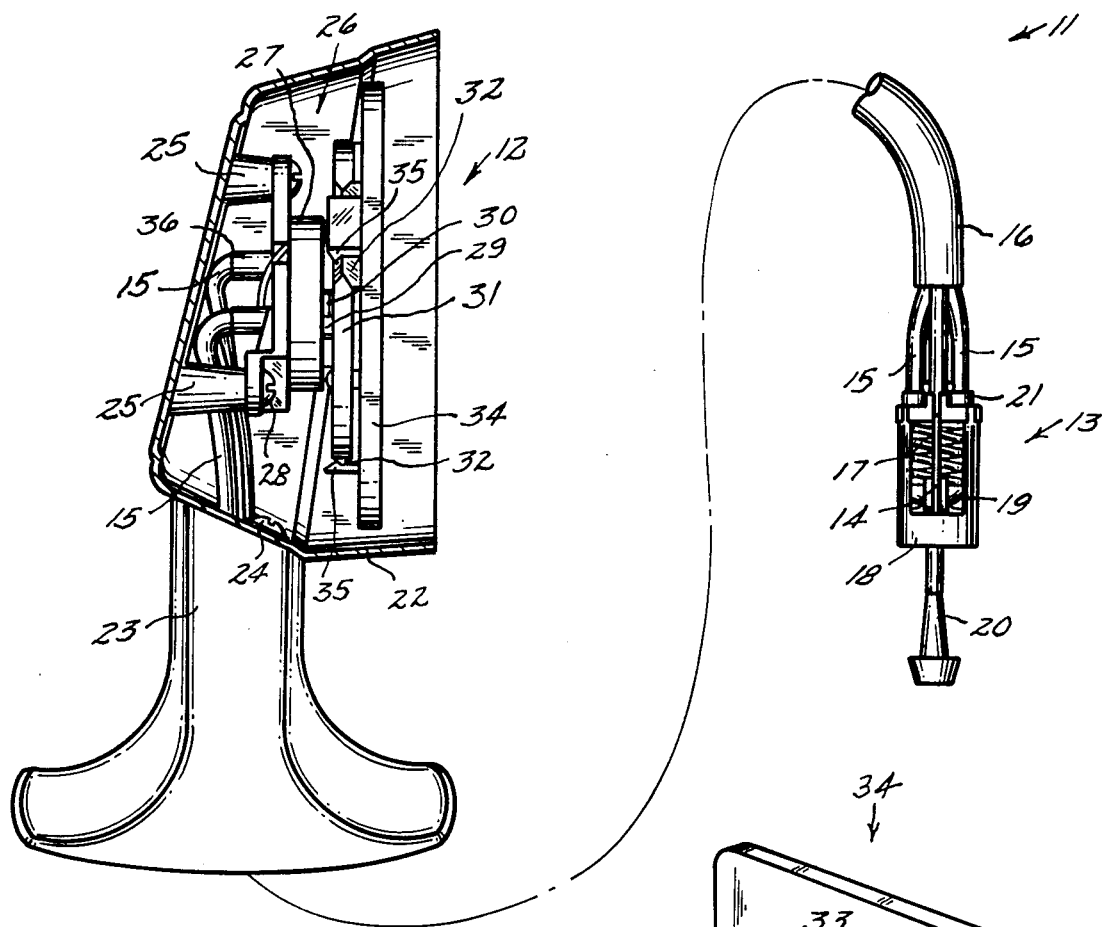
FIG. 1 is a side elevation view of the mirror and actuator in a remote control rearview mirror in accord with the present invention and having portions cut away to reveal the inner construction and pivot assembly relationships of the present invention.

Referring to the drawings and with first specificity to FIG. 1 thereof, a preferred embodiment of the present invention is illustrated in the form of a cable actuated remote control rearview mirror unit 11 comprising the mirror assembly 12 and the actuator assembly 13 and with the interconnected cables 14 each in sheaths 15 and shielded by the tubular encasement 16 running between the actuator 13 and the mirror assembly 12. The cables 14 are tensioned and in the embodiment shown, the tension is applied at the actuator 13 by means of spring 17 which acts against the actuator case 18 and the arcuate headed pin 19. The pin 19 is guided in the case 18 and presses against the pendant or knob 20 which is in mating engagement against the arcuate headed pin 19. The cables 14, usually three in number, are attached (at 120 degree intervals) to the pendant 20 so as to tension all of the cables 14 equally. The sheaths 15 are then under compression and bear against actuator case 18 in the sockets 21. With this arrangement at the actuator 13, movement of the pendant 20 causes corresponding movement of the cables 14 throughout their length. This allows movement at the actuator 13 to be mimicked by the structure at the mirror end to which the cables 14 are attached.

Disassembly formerly required removal of the actuator from its support means inside a vehicle, depression of the spring 17 to release one cable 14 from its connection to the pendant 20 and subsequent similar removal of the other cables 14. Under tension of the cables 14, the assembly of the mirror end is as seen in the FIG. 1 and within the decorative base or mirror shroud 22. The mirror shroud 22 is usually on a pedestal 23 and the shroud 22 is detachably connected to the pedestal 23 by means of fasteners 24. In some instances the shroud 22 is integral with the pedestal 23 and, as will be appreciated, the pedestal 23 is attached to a fender or door or other body or structural part of an automobile so as to locate the mirror convenient to a line of vision from the operator. The actuator 13 is located within easy manual access to the operator for limited universal movement and is usually inside the automobile or vehicle (not shown). Inside the shroud 22 is a mounting boss or bosses 25 to which the mirror support assembly 26 of the present invention is attached. The mirror support assembly 26 includes a receiver element 27 which is fastened to the mounting bosses 25 as by fasteners 28. The assembly 26 also includes a hemispherically mated element 29 so that the relation between the receiver 27 and element 29 is in the manner of a ball and socket where the two mating hemispherical surfaces engage. Between these two mating hemispherical surfaces is a hemispherical cross pivot element 30 functioning as a dual arcuate key between the receiver 27 and mating element 29. The embodiment illustrated shows the receiver 27 as being female in acceptance of the mating male member 29. This will be better appreciated as the description proceeds but under selected circumstances the receiver could be male and secured to the shroud 22 and the mating element female and secured to the mirror. In the preferred embodiment shown, compactness is seen in the described configuration. The male element 29 includes a planal extension 31 transverse of the hemispherical axis, as will be seen, and at selected intervals beveled detenting grip surfaces 32 are provided. Openings are also provided through which guide pins 33 project. The glass case 34, then, includes resilient detent means 35 and the guide pins 33 which together locate and secure the case 34 to the male hemispherical element 29 in a precision manner. This location is achieved by snapping the case 34 with its glass onto the assembly 26, as shown. The mirror glass case 34, thus attached, is not easily disconnected from the assembly 26 without the use of special tools or by breaking the glass and bending the detent elements 35 out of locked relation over the flange bevels 22.

The cables 14, as will be seen, pass through the elements 27, 29 and 30 and are secured under their tension in sockets in the element 29. The sheaths 15 are thrust buttressed under compression in the sleeves 36 in the receiver 27. The tension in the cables 14 maintains the compression assembly of the remote control rearview mirror structure 11 and the cables may be circuitously passed through the vehicle (not shown) from the actuator 13 and operably connected to the mirror unit 11.

Figure 2:
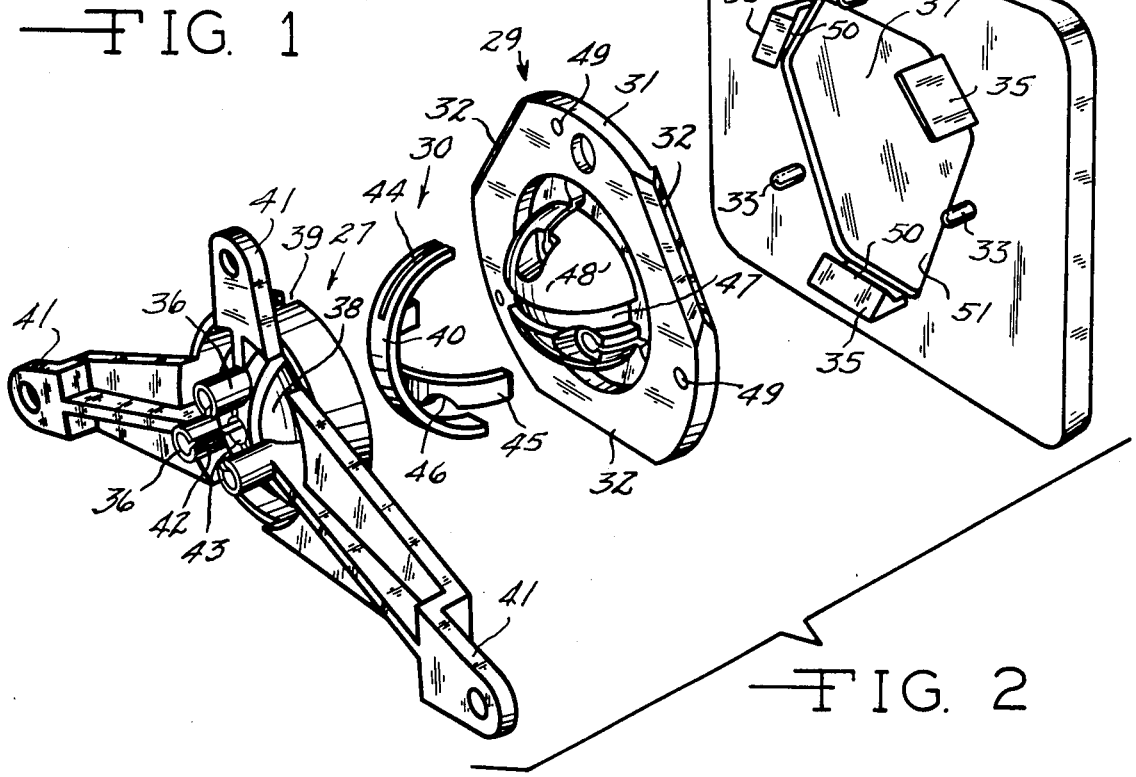
FIG. 2 is an exploded perspective view of the female hemispherical receiver, the spherical segment universal cross pivot element, the male hemispherical element including mounting detent protuberances and the mirror case and integral extending detent lock means for removably attaching the mirror case to the male hemispherical element.

By reference to FIG. 2, the assembly interrelationship as between the female receiver 27, the male mating hemispherical element 29 and the arcuate cross pivot 30 can be best appreciated and FIG. 2 shows the mirror case 34 and mirror glass 37 as it is positioned for snap-on detent attachment to the male hemispherical element 29.

The receiver element 27 includes a female hemispherical socket portion 38 (seen from the rear) and the female surface includes an arcuate keyway 39. The keyway 39 incised in surface 38 mates with the arcuate hemispherical segment 40 of the hemispherical cross pivot 30. Mounting legs 41 extend generally radially from the receiver 27 and are integral therewith for mounting attachment to the mounting bosses 25. This assures a compact profile in the shroud 22. The sleeves 36 extending from the base of the receiver 27 are slotted radially to accommodate the insertion of cables 14 and their terminal ferrules and each includes a buttress surface engaging the larger diameter cable sheaths 15. The slots 42 extend radially from the central axial opening 43 (through the receiver 27) to permit cable penetration and location, as will be seen. The arcuate hemispherical segment 40 (rectangular in cross section) mates in the arcuate keyway 39 and this is seen to allow limited pivoting of the receiver in the plane of the keyway 39 while thus engaged and the single plane is established by the arcuate segment 40. The segment 40 is bifurcated by the slot 44 at one end thereof and the slot 44 accommodates and straddles one of the cables 14 in clearance relation. Arcuate arm 45 is transverse of the arcuate arm 40 and is secured thereto as by integral connection. The arm 45 is also generally rectangular in cross section except for the cable relief 46. The arcuate arm 45 is of lesser diameter than the arcuate arm 40 but nests in the arcuate keyway 47 formed in the male hemispherical element 29. The male hemispherical element 29 mates in the female spherical pocket 38 of the receiver 27 and the hemispherical protruding male portion or segment 48 is backed by the transverse flange or planar extension 31. Locating openings 49 through the flange 31 are in registry with the plural guide pins 33. The pins 33 project from the back of the mirror glass case 34. This establishes precision locating registry of mirror case 34 and included glass 37 against the male element 29 on assembly. The plural bevel edges 32 on the planar extension or flange 31 will be appreciated as providing an interference detenting fit with the detent means 35 which are integrally hinged extensions of the glass or mirror case 34. The lips 50 of the detent means 35 close firmly over the bevel 32 and hold the mirror case 34 against the flange 31. A relief opening 51 through the center of the mirror case 34 will be seen to allow one mode of access to the mirror support assembly 26 when the mirror glass 37 is removed therefrom or is broken. The male hemispherical element 29 also includes openings 52 with connecting slots which permit the cables 14 with terminal ferrules to be threaded through the element 29 and then the cables 14 can nest against thrust buttresses (not visible but on the mirror side of the flange 31). On assembly in this manner, the tensioned cables 14 seat their ferrules so as to provide a compression package with the male hemispherical element 29 pressing the arm 40 of the arcuate cross pivot 30 into the keyway 39 in the receiver and the transverse arm 45 of the same cross pivot into the keyway 47 on the male hemispherical element 29. Then selected movement of the cables 14 creates corresponding movement of the mirror case 34 and mirror glass 37.

By reference to FIG. 3 the receiver 27 is best appreciated looking into the hemispherical pocket 38 and in appreciation of the keyway 39 incised below the hemispherical surface of pocket 38. The function of the central opening 43 is also appreciated along with the connecting slots 42 so that at assembly the cables 14 can be passed therethrough and the sheaths of the cables 14 are buttressed in the sleeves 36. The arms 41 in length and elevation are arranged to suit the mounting conditions.

In FIG. 4 the male hemispherical element 29 is best appreciated and the keyway 47 below the surface of the hemispherical male segment 48 is better understood. The larger openings 52 allow through-passage of cables 14 and terminal ferrules and then the cables 13 are movable radially inwardly in the connecting slots 53 so that the terminal ferrules can drop and rest against the walls 54 acting as a buttress against the ferrules in final assembly. The spherical surface of the male segment 52 is inlet to provide clearance for the slots 53 and openings 52 in respect to the cables 14.

In the FIG. 5 the mirror support assembly 26 is sectioned to show the hemispherical socket-nesting as between the receiver 27, the male hemispherical element 29 in controlled movement relation by the hemispherical arcuate cross pivot 30. Furthermore, the cross sectioning in FIG. 5 reveals the terminal ferrules 55 on the mirror end of the cables 14 in thrust relation against the buttress of the male hemispherical elements 29 and made accessible by the slots 53. The cable 14 is shown passing through the bifurcation of the arm 40 and as can be appreciated the length of the arms 40 and 45 in respect to an interferring surface or shoulder 56 serves to limit the travel of the male element 29 and the mirror 37 attached to the male element 29 by means of the mirror case 34. It should be noted that a tail portion of the ends of the cables 14 extend beyond the ferrules 55 and this, as will be seen, facilitates assembly and disassembly from the mirror end of the remote control rearview mirror unit 11 as contrasted with prior art devices requiring final assembly and commencing disassembly from the actuator 13. The access or relief opening 51 makes the ferrules 55 accessible by removing the glass 37. In addition, special tools allow the mirror case 34 and mirror glass to be removed by disengagement of the detents 35 from the bevels 32 of the flange 31 of the male hemispherical member 29. This is achieved by tools (not shown) which reach between the mirror operating assembly 26 and the decorative shroud 22. By then grabbing the tails or terminal ends of cables 14 the ferrules 55 can be lifted against the spring 17 and freed through the radial slots 53 and openings 52.

In FIG. 6 the male hemispherical element 29 is cross sectioned to indicate the manner in which the cables 14 and their attached ferrules 55 are assembled. The ferrules 55 are secured clamped and anchored to the cables 14. The ferrule ends of the cables 14 are slid radially inwardly through the slots 53 and are dropped into the pockets 56 formed by the convergence of the walls 54 to buttress the thrust of the ferrules 55. Seating occurs by reason of tension in the cables 14. The arrow pointing upward characterizes the assembly insertion of the cable and ferrule through the opening 52. Then the cable is moved to the position of the cable 14 (bearing the arrow pointing downwardly) and upon release the ferrule 55 seats as indicated. In this FIG. 6 the keyway 47 is visible and is sufficiently enlarged to indicate the relief step 57. This step 57 used in both the keyway 39 in receiver 27 and in the male spherical element 29, serves to avoid flash in mass production and to facilitate assembly on insertion of the arcuate cross pivot element 30 between the elements 27 and 29.

The cross section detail of FIG. 7 illuminates the passage of the cable 14 with its terminal ferrules 55 through the central opening 43 in the female receiver 27. This allows the cable 14 to be shifted radially in the slot 42 and upon tensioning the cable 14, the sheath 15, at its mirror end, seats against the buttress barrier 59 in the sleeve 36 of the receiver 27. Where the cable 14 passes through the keyway 39 the bifurcation 44 in the arm 40 of the arcuate cross pivot 30 straddles the cable 14 (best seen in FIG. 5).

In the FIG. 8 the detent structure as connecting the mirror case 34 to the male hemispherical element 29 can be understood. The case 34 with its perimeter flange 60 is generally rectangular and pan-shaped in plan view. The mirror glass 37 is fitted into this pan formed by the case 34 as by a perimeter grip or by adhesive material or by both. This closes the access opening 51 through the bottom of the case. The case 34 is then pressed onto the back and flange 31 of the male hemispherical element 29 guided by the pins 33 in the openings 49. This displaces the resilient detent elements 35 as the bevel 32 forces open the lip 50 and then the lip 50 closes on the other side of the bevel, as shown. This snap-on action is guidably achieved by indexing the pins 33 in the openings 49. If the glass 37 is broken, then the case 34 is easily removed by disconnect of the case 34 from the flange 31. The glass 37 is replaced and the case 34 is restored in assembled detenting relation. Where the mirror support assembly 26 requires repair or replacement disassembly of the assembly 26 is achieved by grabbing the ends of one of the cables 14 accessible behind the mirror 37 and through the opening 51 and lifting them out of their compression engagement with the male hemispherical element 29. This reverses the assembly previously set out and replacements or repairs are then achievable at the mirror end of the remote control structure 11.

Substantial construction economies are realized by manufacture of all of the precision fitting elements from molded plastic material selected for proper strength and durability in the operating thermal and moisture ranges of use. Some or all of these items may be molded from metal as by die casting. As a result, excellent spherical fits and finishes are achieved without complex machining and the structural adaptation to particular designs of decorative shroud 22 is accommodated. Lubricants may be applied in the keyways 39 and 47, as considered necessary, and the arcuate keys of the cross pivot element 30 maintain an excellent and positive directional locking control over mirror vibration or displacement. This is the consequence of making larger mating areas available in respect to hemispherical and key surfaces. By adjusting the length of arms 40 and 45 of the arcuate keys 30, the mirror travel limits are established.

In testing, the breakage of the key elements 30 was fail-safe in character and did not seriously interfere with mirror function.

The described construction makes the pivotal control useful in remote control and manually set rearview mirrors. The construction of the pivots adapts the structure to electrical remote control.

The heaviest part of the assembly in the mirror glass can be positioned so that its center of gravity is proximate to the center of rotation in reduction of bounce and chatter. This arrangement allows a closer glass to decorative shroud fit. Disassembly is easily achieved from the mirror end. The case material can be less expensive because no control wires or cables are attached thereto.

In the construction as described, in use with automobiles, a substantial reduction in weight is realized by the use of plastic parts.

Having thus described my invention and the preferred embodiment therein, those skilled in the art will perceive modifications, changes and improvements therein and such modifications, changes and improvements are intended to be included within the spirit of the present invention and limited only by the scope of my hereinafter appended claims.

I claim:

1. An automotive rearview mirror pivot and mirror support structure comprising:
    a hemispherical socketed receiver having a hemispherical keyway in the hemispherical face thereof;
    a male mating hemispherical segment having a hemispherical keyway formed in the hemispherical face thereof and transversely positioned in respect to said keyway in said socketed receiver;
    a hemispherical segment cross pivot element having a pair of integrated hemispherical arms in transverse directions, one of said hemispherical arms forming a key mating in said hemispherical keyway of said socketed receiver and one of said hemispherical arms mating in said keyway of said male hemispherical segment and said cross pivot element in compression relation between said hemispherical segment male element and said hemispherical socketed receiver element, one of said male and receiver elements having flange and guide means; and
    a mirror case having detent projections and guide pins, said detent means resiliently and lockably engageable over said flange means and said pins extending through said guide means to locate and guide said case to firm engagement with said one of said male and receiver elements having said flange and guide means.

2. The combination of claim 1 wherein said flange and said guide means are respectively bevel edged flange portions and guide openings mating with said pins.

3. A remote control rearview mirror in accord with claim 2 wherein said element connected to said mirror case is connected to remotely controlled actuating means and said actuating means are tensioned to place said cross pivot in compression relation between said male element and said mating receiver.

4. A remote control rearview mirror in accord with claim 3 wherein said actuating means are accessible through said mirror case.

5. The combination mirror structure of claim 4 wherein said actuating means are cables under substantially equal tension engageable with said spherical element connected to said mirror case and passing through said other of said spherical elements and said cross pivot element.

6. A cable operated remote control automotive rearview mirror and cross pivot support combination comprising:
    an actuator having spring means therein and movable in a substantially stabilized limited universal manner;
    a plurality of sheathed cables, said cables connected to said actuator and acted upon by said spring means and movable by said actuator, said sheaths of said cables bearing against said actuator in fixed buttress compression relation and said cables running from said actuator, said cables having ferrules attached near to the ends thereof leaving slight extending tails;
    a hemispherical socketed receiver remote from said actuator and said socket including an arcuate keyway incised in said socketed receiver and said receiver having access openings and radial slots operably passing said cables therethrough and through which said cables are threaded and further including thrust buttresses bearing compressibly against said sheaths of said cables at the ends of said sheaths of said cables remote from said actuator;

a cross pivot having hemispherical transverse integral arms, one of said arms nesting in said keyway in said receiver;

a male hemispherical element including a flanged outer portion, said flanged outer portion including beveled detent sections and having guide openings therethrough and said hemispherical element including a first hemispherical keyway and a second hemispherical keyway transverse of the plane of said first mentioned keyway and mating with the other of said hemispherical arms of said cross pivot and said male hemispherical element including a central axial opening therethrough and through which said cables and their said ferrules are passed and said opening having connected radial slots for said cables, and having thrust buttresses transverse of said slots against which said ferrules rest under the tension in said cables;

a mirror case having integral extending resilient detent locks and pins, said pins through said guide openings in said male hemispherical element and said detent locks over said beveled detent sections of said flange of said male element whereby connection of said mirror case to said male hemispherical element is achieved and access to said tail ends of said cables is beneath said mirror case; and a mirror shroud and pedestal to which said receiver is attached, adapted to be selectively connected to an automobile, said cables passing through said automobile, said mirror shroud and pedestal to connection with said male hemispherical element whereby cable movement at said actuator results in corresponding movement of said mirror case.

* * * * *

UNITED STATES PATENT AND TRADEMARK OFFICE
CERTIFICATE OF CORRECTION

PATENT NO. : 4,628,760
DATED : 1986 December 16
INVENTOR(S) : Chester R. Huddleston It is certified that error appears in the above-identified patent and that said Letters Patent is hereby corrected as shown below:

Column 1, line 38, delete "spherical"

Column 5, line 22, change "spherical" to read --- hemispherical ---

Column 6, line 3, change "spherical" to read --- hemispherical ---

Column 6, line 40, change "secured" to read --- securely ---

Column 8, line 44, change "spherical" to read --- hemispherical ---

Column 8, line 46, change "spherical" to read --- hemispherical ---

Signed and Sealed this

Seventh Day of April, 1987

*Attest:*

DONALD J. QUIGG

*Attesting Officer*   *Commissioner of Patents and Trademarks*